G. WHITCOMB.
HORSE RAKE.
No. 2,994. Reissued June 16, 1868.
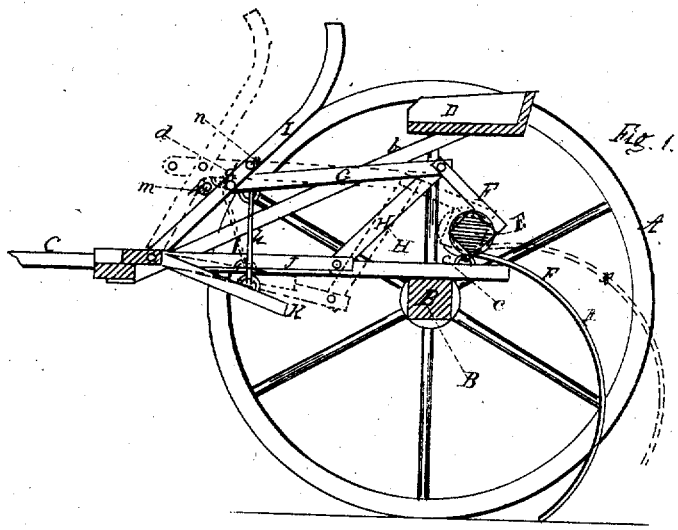
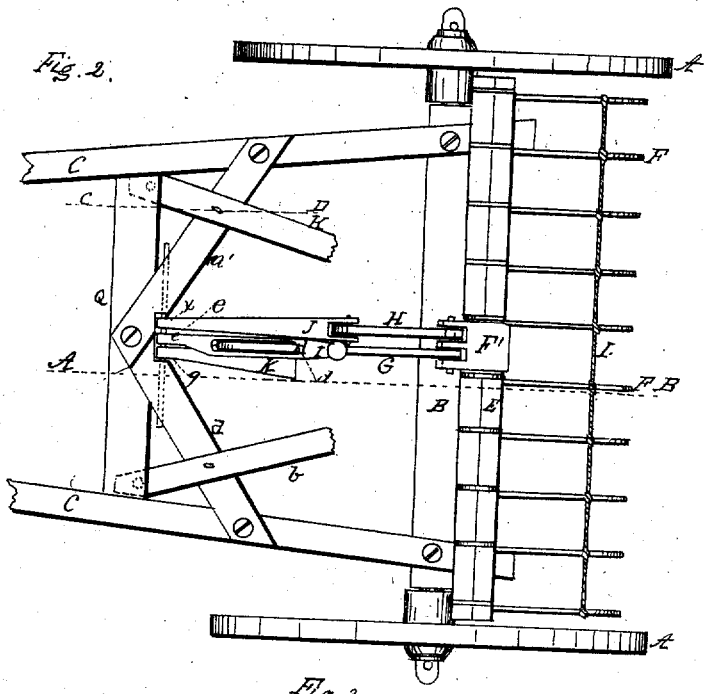
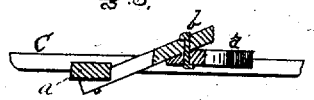
Witnesses.
William Slater
Daniel D. Dunn
Inventor.
Geo Whitcomb

United States Patent Office.

GEORGE WHITCOMB, OF PORTCHESTER, NEW YORK.

*Letters Patent No.* 21,712, *dated October* 5, 1858; *reissue No.* 2,994, *dated June* 16, 1868.

IMPROVEMENT IN HORSE-RAKES

The Schedule referred to in these Letters Patent and making part of the same.

TO ALL WHOM IT MAY CONCERN:

Be it known that I, GEORGE WHITCOMB, of Portchester, in the county of Westchester, and State of New York, have invented a new and improved Horse-Rake; and I do hereby declare that the following is a full, clear, and exact description of the same, reference being had to the annexed drawings, making a part of this specification, in which—

Figure 1 represents a side sectional elevation of a horse-rake constructed according to my invention, the line of section being indicated by line A B, fig. 2, the shaft being shown broken away.

Figure 2 represents a plan or top view of the rake, without the seat, the shafts and seat-supports being shown broken off; and Figure 3 represents a section on line C D, fig. 2.

To enable those skilled in the art to which my invention belongs to make and use the same, I will proceed to describe it more in detail.

In the drawings, A A are the main supporting and carrying-wheels, fitted to turn upon the ends of the axle B, to which the rear ends of the shafts or thills C C are securely attached. The thills or shafts C C are connected, and braced in front of the axle, as shown at *a a′ a′*. The driver's seat, D, is supported by two spring-arms, *b*, one on each side. The lower points of the arms *b* pass down over the angular braces *a′ a′*, and under the cross-brace *a*, whereby a secure attachment is obtained for the spring-arms, to the rear upper ends of which the seat D is attached.

The rear end of the thills or shafts extends back on the axle B sufficiently far to enable the rake-head E to be hinged thereto by eye-bolts or hinge-connections *c*, one to each shaft, the hinges *c* being under the head E, as indicated in the drawings.

The rake-head E is parallel with the axle B, and is provided with a series of wire teeth, F, said teeth being coiled once or twice around the head, to give a certain degree of elasticity to them. The teeth are coiled in grooves or gains cut in the corners of the head E, for retaining the teeth in proper position, or from too much lateral play, (see fig. 2.)

A bar or arm, F′, is attached to the back of the head E, so as to project up at right angles with the head, as indicated in the drawings. To the upper end of bar or arm F′ are hinged or pivoted the rear ends of the arms G and H. The front end of arm G is pivoted or hinged to the hand-lever I, which in this instance is slotted out to receive the lever G, as shown at *d*, while its lower end is hinged or pivoted to the front ends of the braces *a′ a′*, as shown at *e*. The lower end of arm H is hinged or pivoted to the rear and lower end of the foot-treadle J, the front end of which treadle J being hinged or pivoted to the angle-braces *a′ a′*, as shown at *f*.

Another foot-treadle, K, is hinged or pivoted to the angle-braces *a′ a′*, as shown at *g*, and the rear inner part of the foot-treadle K is connected to the front part or end of arm G by a link or rod, *h*, (see fig. 1.)

L is a rope, which is fitted on the teeth F, the rope being either looped around the teeth, or the teeth passed between its strands, so that the rope may be raised or lowered on the teeth, as may be desired, to adjust it to the proper position upon the teeth, to prevent the hay from working up and back upon the teeth so far as to interfere with a free and perfect discharge thereof. As this part of my invention, however, forms the subject of separate Letters Patent, no further description is here deemed necessary.

The operation is as follows:

The driver, while sitting on seat D, can rest his right foot on the treadle J, and his left foot on the treadle K, whereby he can turn the head E, to elevate or depress the teeth F, as he may desire. When the driver depresses lever J, the bar or piece F′ and head E are drawn or turned forward, and the rake-teeth F are raised or elevated, as indicated in red lines, fig. 1, while, when he presses on treadle K, lever I is drawn back, and the arm or connection G forces bar F′ back, and the teeth are held down, as shown in dark lines, same figure. It will be observed that a positive movement will be given the rake-teeth in both directions. The driver can, by the hand-lever I, assist the feet, moving the rake-teeth in either direction, or he can elevate and depress the rake-teeth by the hand-lever I alone.

The arrangement of the driver's seat D over the head of the rake, and the further combination, with the head of the rake, of a foot-treadle for elevating the teeth, and another foot-treadle for holding the teeth down, both being so arranged that one treadle can be operated by one foot, and the other treadle by the other foot, while both treadles are so arranged as to permit the limbs of the driver to occupy comparatively easy and natural positions while the rake is in operation, gives to my invention great practical merit. This will be more fully understood by observing that the bar or piece F′ projects up under the seat, and above the treadles, whereby the connection H is extended down at nearly a right angle to the piece or bar F′, and is hinged to the foot-treadle piece J, so as to allow the limb of the driver sufficient room for an easy sitting position when the rake is gathering the hay, while the treadle-piece, when acted upon by the foot of the driver, moves in a direction corresponding to the natural position of the limb when being straightened out.

The treadle K, too, is so combined with the arm G, as to move in a direction corresponding to the natural motion of the limb when the latter is straightened out from the bent position it assumes when not required to force the piece F′ back, as before explained.

As the foot-treadle J is hinged at its front end, and is furthermore combined with the double-hinged bar or piece H, the rear end of which is hinged to the upper end of the projecting bar or piece F′, the rear end of the elevating foot-treadle J is drawn forward or away from the head, to which the teeth are attached, whereby the angle at which the connection or arm H draws upon the piece F′ remains about the same at all times, thus preventing the power exerted upon treadle J by the driver's foot from being counteracted by a material decrease of leverage.

It will furthermore be observed that the arm or connection H is combined and arranged so as to act at about right angles to the piece or bar F′, while the latter is fastened to the head, so as to act upon the latter at about the same angle, (see fig. 2.)

As the head E works or turns on the joints *c*, the weight thereof serves to counterpoise the teeth F, since, in depressing the treadle J, the head E is turned, so that its centre of gravity will pass over to the front side of joints *c*, thereby counterbalancing the weight of the teeth F, and thus aid in elevating the same.

The teeth F will not penetrate or harrow up light ground, since the rake-head E turns freely on its joints *c*, which, in connection with the elasticity of the teeth, precludes the possibility of the ground being cut into by the teeth, while at the same time the teeth are kept down so that they will not be raised casually, although allowed to conform to the inequalities of the ground. The driver, however, has it in his power and can at any time, by pressing on treadle K, cause the teeth F to be forced or held down, so as to rake and gather very heavy hay, and this arrangement is very convenient, especially in raking up hay that has been once cocked or tumbled, and then opened to sun or dry.

It will be further observed, that as the bar or piece F′ is fastened to the back of the head to which the teeth are attached, it is not liable to be broken or split off, while, by my arrangement of foot-levers or treadles, it is made to answer for the attachment of one end of the device which depresses the teeth, as well as that by which they are raised or elevated to discharge the hay from the teeth to form the windrow. The teeth may be elevated to any desired height.

By my improvements, the driver can, and that, too, without an unnatural twisting of the body, at any time elevate the teeth by one of his feet, while at the same time he can by his other foot depress them, or he can, with the hand-lever, which is arranged in front of him, give a positive motion to the head and teeth in either direction.

The arrangement is such, too, that the driver, as he sits upon his seat, can rest his feet upon the levers or foot-treadles so as to balance each other, or nearly so, thereby leaving the head and teeth of the rake to conform freely to the inequalities of the ground, while his feet are in the proper positions to be brought into active use upon their respective treadles as occasion may require. The driver can easily elevate the teeth by his foot to pass holes, water-runs, or obstructions, as well as for the purpose of discharging the hay to form the windrow. Again, by providing the end of the arm G with more than one hole, *m*, or the hand-lever I with more than one hole, *n*, the arm G may be so connected or adjusted as to retain the teeth F in any desired position above the ground, for the purpose of raking grain.

It will be observed that the front of arm or lever G is hinged, and supported as high or nearly so as its rear end, whereby, when it is forced back by the driver pressing his foot on treadle K, it acts with increasing leverage as piece F′ approaches the position which it occupies when the teeth are gathering the hay upon the ground.

It is apparent that my improvements may be carried out by a modification of the parts of the rake without departing from the principle of my invention.

Having described my improved horse hay-rake, what I claim therein as new and of my invention, and desire to secure by these Letters Patent, is—

1. The combination and relative arrangement of the rake-head E and axle B, substantially as and for the purposes set forth.

2. The combination and relative arrangement of the hinged rake-head with the supporting-axle and carrying-wheels, substantially as shown and described, whereby the head is supported above the rear upper edge of the axle, as shown, and the lower ends of the teeth, when gathering the hay, occupy positions in rear of the tread of the wheels, and forward of a vertical plane on a line with the rear edge of the wheels, substantially as shown in the accompanying drawings.

3. The combination of the rake-head E, thills or shafts C C, hinges *c*, and axle B, substantially as described.

4. The arrangement of the rake-head E and foot-treadles H J and G K, or either, in relation to each other and the axle B, substantially as and for the purposes set forth.

5. The arrangement of the rake-head E, foot-treadles H J G K, and hand-lever I, in relation to each other and the axle B, substantially as and for the purposes set forth.

GEO. WHITCOMB.

Witnesses:

WILLIAM G. SLATER,

DANIEL D. DUNN.